(12) United States Patent
Yamamura et al.

(10) Patent No.: US 6,650,990 B2
(45) Date of Patent: Nov. 18, 2003

(54) VEHICULAR RUNNING CONTROL APPARATUS

(75) Inventors: Yoshinori Yamamura, Kanagawa-ken (JP); Yoji Seto, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/115,002

(22) Filed: Apr. 4, 2002

(65) Prior Publication Data

US 2002/0169538 A1 Nov. 14, 2002

(30) Foreign Application Priority Data

May 11, 2001 (JP) ........................................ 2001-140838

(51) Int. Cl.[7] .................................................. B60T 8/32
(52) U.S. Cl. ........................... 701/96; 701/301; 340/435; 340/436; 340/441; 340/444; 340/467; 340/903
(58) Field of Search ................... 701/96, 301; 342/104, 342/109; 340/902, 903, 435, 436, 444, 441, 465, 467; 180/170, 282, 169

(56) References Cited

U.S. PATENT DOCUMENTS

| | | | | |
|---|---|---|---|---|
| 5,396,426 A | * | 3/1995 | Hibino et al. | 180/170 |
| 6,330,507 B1 | * | 12/2001 | Adachi et al. | 701/96 |
| 6,415,217 B1 | * | 7/2002 | Higashimata et al. | 701/96 |
| 6,484,087 B2 | * | 11/2002 | Shirai et al. | 701/96 |

| | | | | |
|---|---|---|---|---|
| 2002/0138192 A1 | * | 9/2002 | Lueder et al. | 701/93 |

FOREIGN PATENT DOCUMENTS

| | | |
|---|---|---|
| JP | 11-268558 | 10/1999 |
| JP | 02000057500 A | * 2/2000 |

* cited by examiner

Primary Examiner—Thomas G. Black
Assistant Examiner—Tuan C To
(74) Attorney, Agent, or Firm—Foley & Lardner (57) ABSTRACT

A target orbit of an inter-vehicle distance is calculated based on an inter-vehicle distance command value, a target orbit coincident-host vehicle running speed command value for according the inter-vehicle distance with the target orbit is calculated, and a reference host vehicle running speed command value is calculated by use of the target orbit and the target orbit coincident-host vehicle running speed command value. Moreover, a preceding vehicle acceleration is detected, and a value obtained by multiplying the preceding vehicle acceleration by a response time constant of a host vehicle running speed control system is added to the reference host vehicle running speed command value, thus a host vehicle running speed command value is calculated and set, whereby an influence of the preceding vehicle acceleration is removed, and a follow-up characteristic to an inter-vehicle distance target value is improved. When ride comfort is lowered due to an influence of a noise, a gain multiplied with the preceding vehicle acceleration is made variable in a range from the response time constant to zero, whereby a feedback effect of the preceding vehicle acceleration is controlled.

11 Claims, 7 Drawing Sheets

VEHICULAR RUNNING CONTROL APPARATUS

BACKGROUND OF THE INVENTION

1. Field of the Invention

The present invention relates to a vehicular running control apparatus for use in, for example, preceding vehicle follow-up running control equipment or the like mounted on a host vehicle running behind a preceding vehicle thereof while maintaining a proper inter-vehicle distance between the host vehicle and the preceding vehicle.

2. Description of the Related Art

There have been proposed vehicular running control apparatuses, each of which sets a target inter-vehicle distance in accordance with a running speed of a host vehicle, detects an inter-vehicle distance between the host vehicle and a preceding vehicle thereof, and controls braking/driving force so that the detected inter-vehicle distance coincides with the target inter-vehicle distance, thus controlling a running state of the host vehicle. Among the vehicular running control apparatuses, the one described in the gazette of Japanese Patent Application Laid-Open No. Hei 11 (1999)-268558 calculates a running speed command value of the host vehicle for allowing the inter-vehicle distance to follow the target value by feedback control for the inter-vehicle distance and a relative speed therebetween, calculates a drive shaft torque command value for following the running speed command value of the host vehicle, and calculates manipulated variables of engine torque and a brake actuator, that is, controlled variables of the driving force and the braking force, for following the drive shaft torque command value, thus controlling the braking/driving force in response to the calculated controlled variables.

SUMMARY OF THE INVENTION

It is an object of the present invention to provide a vehicular running control apparatus, which detects an acceleration of a preceding vehicle, and in response to a running state, adjusts a gain by which the acceleration is multiplied, adjusts a deadband width, or adjusts responsiveness of a low-pass filter, thus can obtain a specified response for an inter-vehicle distance.

To achieve the object described above, the present invention provides a vehicular running control apparatus, comprising:

an inter-vehicle distance detection device configured to detect an inter-vehicle distance between a host vehicle and a preceding vehicle;

a host vehicle running speed detection device configured to detect a host vehicle running speed;

a target inter-vehicle distance setting device configured to set a target inter-vehicle distance between the host vehicle and the preceding vehicle based on the inter-vehicle distance detected by the inter-vehicle distance detection device and the host vehicle running speed detected by the host vehicle running speed detection device;

a host vehicle running speed command value calculation device configured to calculate a running speed command value of the host vehicle based on the inter-vehicle distance detected by the inter-vehicle distance detection device, the host vehicle running speed detected by the host vehicle running speed detection device and the target inter-vehicle distance set by the target inter-vehicle distance setting device;

a preceding vehicle acceleration detection device configured to detect an acceleration of the preceding vehicle;

a host vehicle running speed command value correction device configured to multiply the acceleration of the preceding vehicle, the acceleration being detected by the preceding vehicle acceleration detection device, by a specified gain to calculate a host vehicle running speed command value correction amount, and to add the host vehicle running speed command value correction amount to the host vehicle running speed command value to calculate a corrected host vehicle running speed command value; and a host vehicle running speed control device configured to control the host vehicle running speed based on the corrected host vehicle running speed command value corrected by the host vehicle running speed command value correction device, wherein a response time constant when the host vehicle running speed control device controls the host vehicle running speed based on the corrected host vehicle running speed command value is set at the specified gain multiplied with the acceleration of the preceding vehicle.

DESCRIPTION OF THE PREFERRED EMBODIMENTS

Hereinafter, description will be made for embodiments of the present invention with reference to the drawings.

Figure 1:
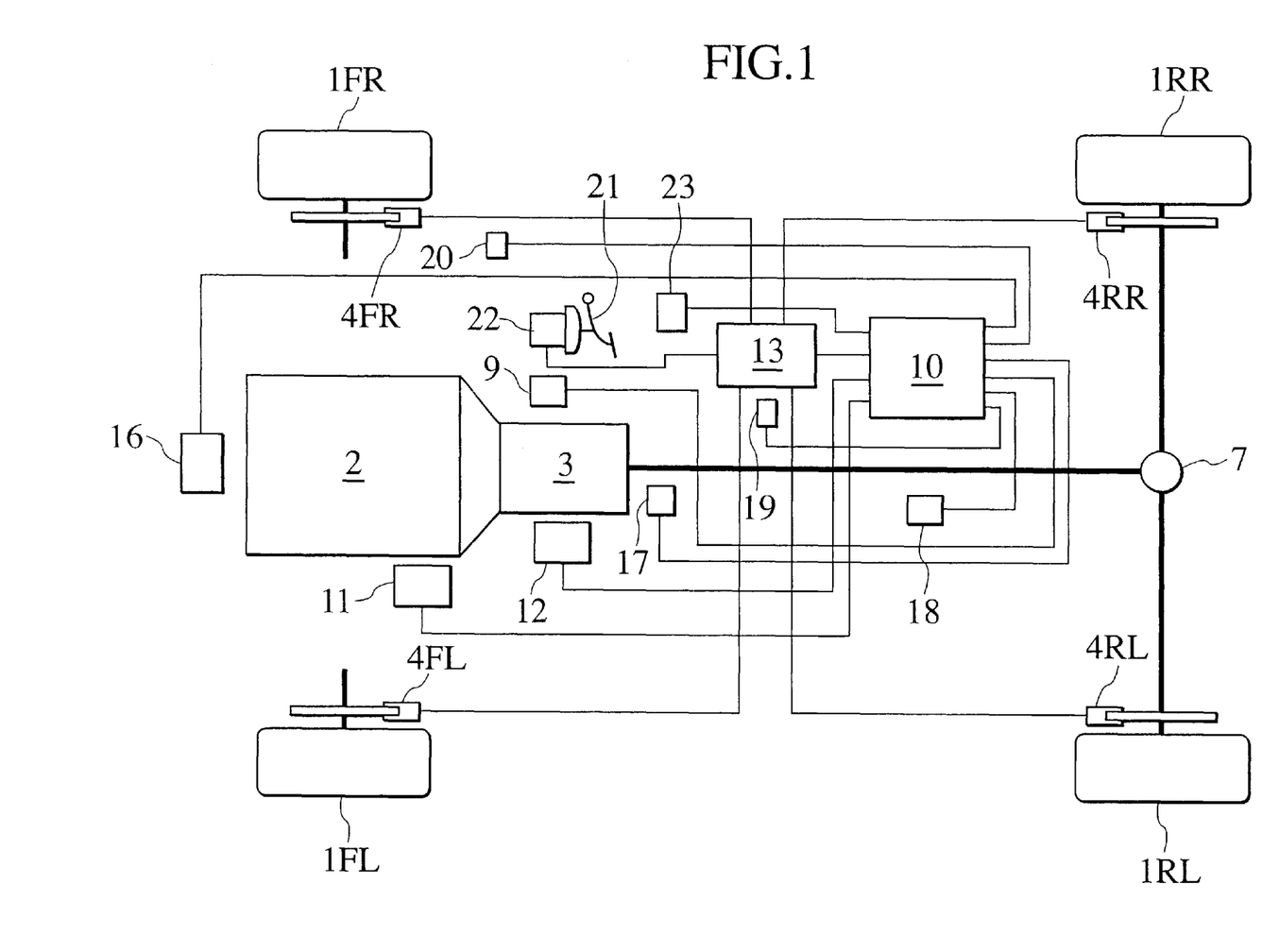
FIG. 1 is a constitutional view of a vehicle, showing one example of a vehicle equipped with preceding vehicle follow-up running control equipment provided with a vehicular running control apparatus of the present invention.

FIG. 1 is a constitutional view of a system, showing one embodiment of a vehicle equipped with a follow-up running control apparatus for a host vehicle running behind a preceding vehicle thereof, to which a vehicular running control apparatus of the present invention is applied. This vehicle is a rear-wheel-drive vehicle having rear wheels 1RL and 1RR as drive wheels and front wheels 1FL and 1FR as undriven wheels, in which drive torque of an engine 2 is transmitted from an automatic transmission 3 via a differential gear 7 to the rear wheels 1RL and 1RR.

It is possible to control a revolution state, torque, an output and the like of the engine 2 by means of an engine control apparatus 11. Concretely, adjustment is made for an opening angle of a throttle valve, an opening angle of an idle valve, ignition timing, a fuel injection amount, fuel injection timing and the like, whereby the revolution state, the torque, the output and the like can be controlled.

Moreover, it is possible to control the automatic transmission 3 by means of a transmission control apparatus 12. Concretely, an operating fluid pressure in the automatic transmission 3 is adjusted, which is supplied to a clutch or brakes, whereby a gear ratio to be selected can be changed to obtain a desired reduction ratio.

Moreover, the wheels 1FL to 1RR include wheel cylinders 4FL to 4RR constituting so-called disk brakes, respectively. The wheel cylinders 4FL to 4RR impart braking force to the wheels 1FL to 1RR by a brake fluid pressure supplied thereto, respectively. Furthermore, it is possible to control the braking force imparted to the respective wheels 1FL to 1RR by means of a brake fluid pressure control apparatus 13. Concretely, for example, the brake fluid pressure is increased as in a torque control system (TCS), or the brake fluid pressure is decreased as in an anti-skid brake system (ABS), whereby the brake fluid pressure to the respective wheel cylinders 4FL to 4RR can be adjusted, thus controlling the braking force to the wheels 1FL to 1RR. Note that the brake fluid pressure adjusted in the brake fluid pressure control apparatus 13 is supplied from a master cylinder 22 of which pressure is increased by stepping a brake pedal 21.

Any of the control apparatuses described above is for controlling a running state of the vehicle, in which acceleration/deceleration, a speed in a longitudinal direction and the like of the host vehicle are resultantly adjusted to enable the running state control.

As a matter of course, each of the control apparatuses can be operated singly; however, all of the control apparatuses are administered by an automatic running control apparatus 10 including overall control functions of the inter-vehicle distance and the follow-up running of the host vehicle running behind the preceding vehicle. This automatic running control apparatus 10 executes a variety of operation processing to control the running state of the vehicle, thus controlling the inter-vehicle distance, the follow-up running of the host vehicle running behind the preceding vehicle and the like.

Moreover, the vehicle includes a forward state detection apparatus 16 for detecting a forward state of the host vehicle, for example, the existence of a preceding vehicle thereof or for detecting a distance to the preceding vehicle or a relative speed of the preceding vehicle to the host vehicle, the forward state detection apparatus 16 being provided with, for example, a milliwave radar. The vehicle further includes a wheel speed sensor 17 for detecting rotational speeds of the wheels 1FL to 1RR, an acceleration sensor 18 for detecting longitudinal and lateral accelerations occurring in the vehicle, a brake fluid pressure sensor 19 for detecting the brake fluid pressure and a throttle opening angle sensor 20 for detecting a stepping-on measurement of an accelerator pedal. Moreover, the vehicle includes a manual switch 9 for adjusting the running state of the host vehicle by a manual input of a driver. Furthermore, the vehicle includes display/speaker 23 for presenting control contents by the automatic running control apparatus 10 to passengers, particularly to the driver.

Figure 2:
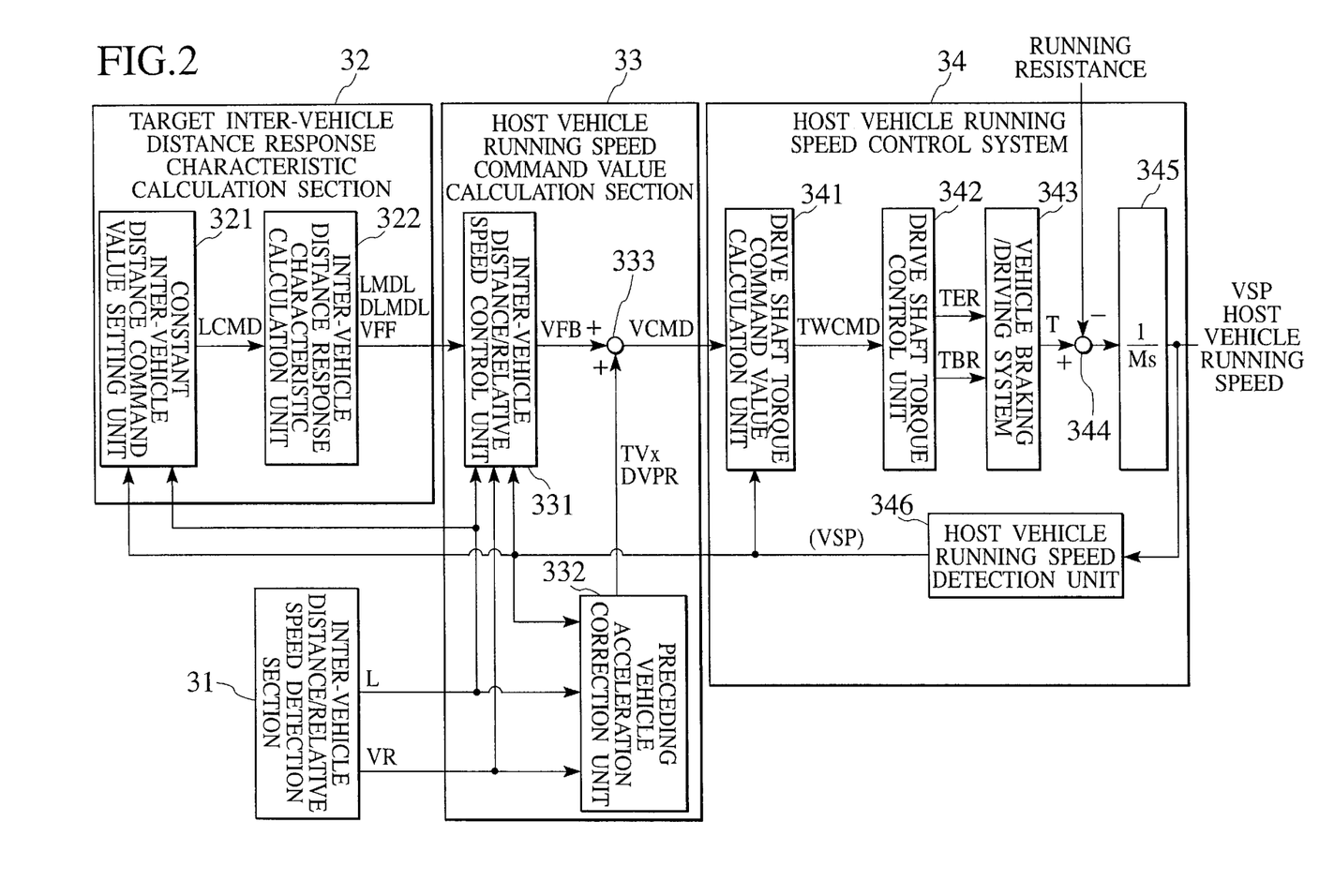
FIG. 2 is a block diagram showing a first embodiment of the vehicular running control apparatus of the present invention.

The vehicular running control apparatus composed of the automatic running control apparatus 10, the engine control apparatus 11, the transmission control apparatus 12 and the brake fluid pressure control apparatus 13 is constituted as shown in FIG. 2. As described above, the vehicular running control apparatus is for controlling the running speed of the host vehicle while providing the proper inter-vehicle distance to the preceding vehicle.

This vehicular running control apparatus is broadly divided into four blocks. This vehicular running control apparatus is constituted of an inter-vehicle distance/relative speed detection section 31 for detecting an inter-vehicle distance L between the preceding vehicle and the host vehicle and a relative speed VR of the preceding vehicle to the host vehicle, which are detected by means of the forward state detection apparatus 16 constituted of the milliwave radar and the like, a target inter-vehicle distance response characteristic calculation section 32 for calculating a target inter-vehicle distance response characteristic by use of the inter-vehicle distance L detected in the inter-vehicle distance/relative speed detection section 31 and a host vehicle running speed VSP detected in a host vehicle running speed detection unit to be described later based on an average wheel speed of the front left and right wheels 1FL and 1FR as undriven wheels, the average wheel speed being detected in the wheel speed sensor 17, a host vehicle running speed command value calculation section 33 for calculating a host vehicle running speed command value VCMD by use of the inter-vehicle distance L, the relative speed VR, the target inter-vehicle distance response characteristic and the host vehicle running speed VSP, and a host vehicle running speed control system 34 for controlling the host vehicle running speed VSP in response to the host vehicle running speed command value VCMD calculated in the host vehicle running speed command value calculation section 33.

The inter-vehicle distance/relative speed detection section 31 can detect the inter-vehicle distance L between the host vehicle and the preceding vehicle and the relative speed VR of the preceding vehicle to the host vehicle simultaneously by means of the forward state detection apparatus 16 constituted of the milliwave radar as described above. However, for example in the case of using image information photographed by laser radar or camera, the relative speed VR cannot be directly detected though the inter-vehicle distance L can be detected. In such a case, the relative speed VR is detected based on a rate of change of the inter-vehicle distance L.

The host vehicle running speed control system 34 includes a host vehicle running speed detection unit 346 for detecting the host vehicle running speed VSP based on the average wheel speed of the front left and right wheels 1FL and 1FR as undriven wheels, which is detected in the wheel speed sensor 17, a drive shaft torque command value calculation unit 341 for calculating a drive shaft torque command value TWCMD based on the host vehicle running speed command value VCMD calculated in the host vehicle running speed command value calculation section 33 and the host vehicle running speed VSP detected in the host vehicle running speed detection unit 346, a drive shaft torque control unit 342 for calculating an engine torque command value TER and a brake torque command value TBR based on the drive shaft torque command value TWCMD calculated in the drive shaft torque command value calculation unit 341, and a vehicle braking/driving system 343 for controlling drive torque T of the rear left and right wheels 1RL and 1RR as drive wheels based on the engine torque command value TER and the brake torque command value TBR, which are calculated in the drive shaft torque control unit 342. Then, on the block diagram, torque obtained by subtracting, by means of an adder/subtractor 344, running resistance from the drive torque controlled in the vehicle braking/driving system 343 is integrated by means of an integrator 345 and divided by a quantity M of the host vehicle, whereby the host vehicle running speed VSP is achieved.

Figure 3:
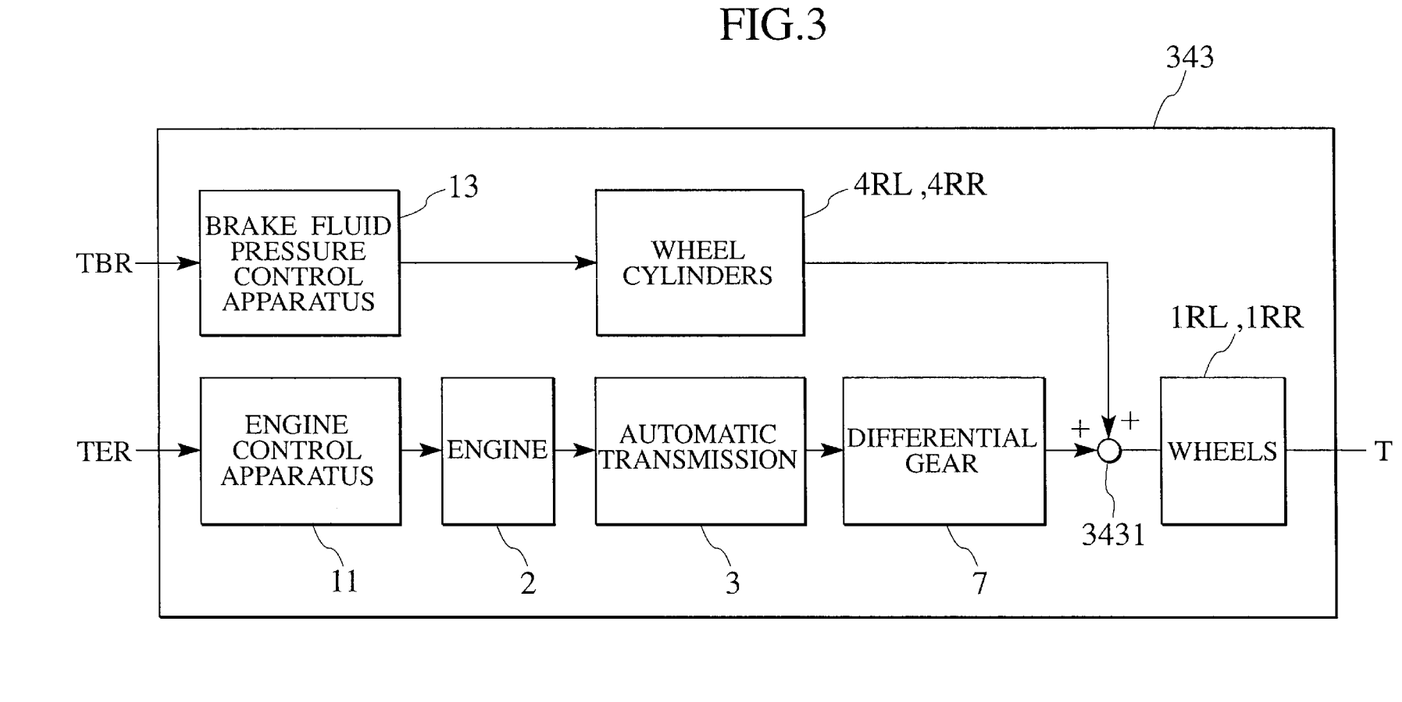
FIG. 3 is a block diagram of a vehicle braking/driving system of FIG. 2.

In FIG. 3, a constitution of the vehicle braking/driving system 343 for the rear left and right wheels 1RL and 1RR as the drive wheels is particularly shown. In the vehicle braking/driving system 343, torque of the engine 2 is controlled in the engine control apparatus 11 based on the engine torque command value TER, and the torque is converted into the drive torque in the automatic transmission 3 and transmitted via the differential gear 7 to the rear wheels 1RL and 1RR. Moreover, the brake fluid pressure is controlled based on the brake torque command value TBR in the brake fluid pressure control apparatus 13, and the brake fluid pressure is supplied to the wheel cylinders 4RL and 4RR, then the braking force thereby generated is transmitted to the rear wheels 1RL and 1RR. Note that a reference numeral 3431 denotes an adder on the block diagram.

Figure 4:
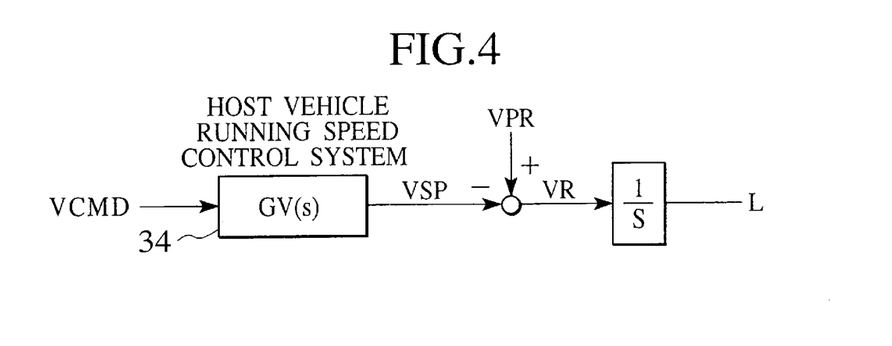
FIG. 4 is a block diagram of a control system for an output of an inter-vehicle distance with respect to an input of a running speed command value of a host vehicle.

FIG. 4 shows a control system for receiving the host vehicle running speed command value VCMD, and controlling the host vehicle running speed VSP in the host vehicle running speed control system 34, thus outputting the inter-vehicle distance L. In this case, a preceding vehicle running speed VPR becomes a disturbance, and the relative speed VR obtained by subtracting the host vehicle running speed VSP from the preceding vehicle running speed VPR is integrated to output the inter-vehicle distance L. Here, assuming that the host vehicle running speed command value VCMD is controlled by means of a first-order lag system GV(s) for allowing the host vehicle running speed VSP to be a time constant TV (that is, a cutoff frequency ωV=1/TV), this control system is represented by the following equations (1) to (4).

$$L(s)=s^{-1} \cdot (VPR(s)-GV(s) \cdot VCMD(s)) \tag{1}$$

where $$GV(s)=BV(s)/AV(s) \tag{2}$$

$$BV(s)=1 \tag{3}$$

$$AV(s)=TV \cdot s+1 \tag{4}$$

The target inter-vehicle distance response characteristic calculation section 32 includes a constant inter-vehicle distance command value setting unit 321 and an inter-vehicle distance response characteristic calculation unit 322. Among them, the constant inter-vehicle distance command value setting unit 321 calculates, as a constant inter-vehicle distance command value LCMD, a constant value of a target inter-vehicle distance, which is, for example, defined as optimal in the host vehicle running speed VSP, based on the inter-vehicle distance L detected in the inter-vehicle distance/relative speed detection section 31 and the host vehicle running speed VSP detected in the host vehicle running speed detection unit 346.

The inter-vehicle distance response characteristic calculation unit 322 includes a target orbit calculation subunit for calculating a target orbit LMDL of the inter-vehicle distance and a value obtained by integrating the same once, that is, a target relative speed DLMDL, and includes a preliminary compensator calculation subunit. Among them, the target orbit calculation subunit receives the constant inter-vehicle distance command value LCMD calculated and set in the constant inter-vehicle distance command value setting unit 321, and calculates the target orbit LMDL of the inter-vehicle distance and the target relative speed DLMDL by means of filtering operations for a secondary vibration system of an eigenfrequency ωm and a damping factor ζm, which are represented in the following equations (5) to (9).

$$LMDL(s)=GM(s) \cdot LCMD(s) \tag{5}$$

$$DLMDL(s)=s \cdot GM(s) \cdot LCMD(s) \tag{6}$$

where $$GM(s)=BM(s)/AM(s) \tag{7}$$

$$BM(s)=\omega m^2 \tag{8}$$

$$AM(s)=s^2+2 \cdot \zeta m \cdot \omega m \cdot s+\omega m^2 \tag{9}$$

In the preliminary compensator calculation subunit, a target orbit coincident-host vehicle running speed command value VFF for according the inter-vehicle distance L with the target orbit LMDL is calculated in accordance with the following equations (10) and (11) by use of a reverse system of a propagation characteristic $s^{-1} \cdot GV(s)$ from the host vehicle running speed command value VCMD to the inter-vehicle distance L when the preceding vehicle running speed VPR is set at zero in the above equation (1) and by use of a transfer function GM(s) defined by the above equations (7) to (9).

$$VFF(s)=GFF(s) \cdot LCMD(s) \tag{10}$$

$$GFF(s)=GM(s)/\{s^{-1} \cdot GV(s)\} \tag{11}$$

The host vehicle running speed command value calculation section 33 is constituted by including an inter-vehicle distance/relative speed control unit 331 for calculating a reference host vehicle running speed command value VFB, a preceding vehicle acceleration correction unit 332 for calculating a value obtained by multiplying a preceding vehicle acceleration DVPR by a specified gain TV, and an adder 333 for calculating the host vehicle running speed command value (corrected host vehicle running speed command value) VCMD based on the sum of the reference host vehicle running speed command value VFB and the value obtained by multiplying the preceding vehicle acceleration DVPR by the specified gain TV.

Figure 5:
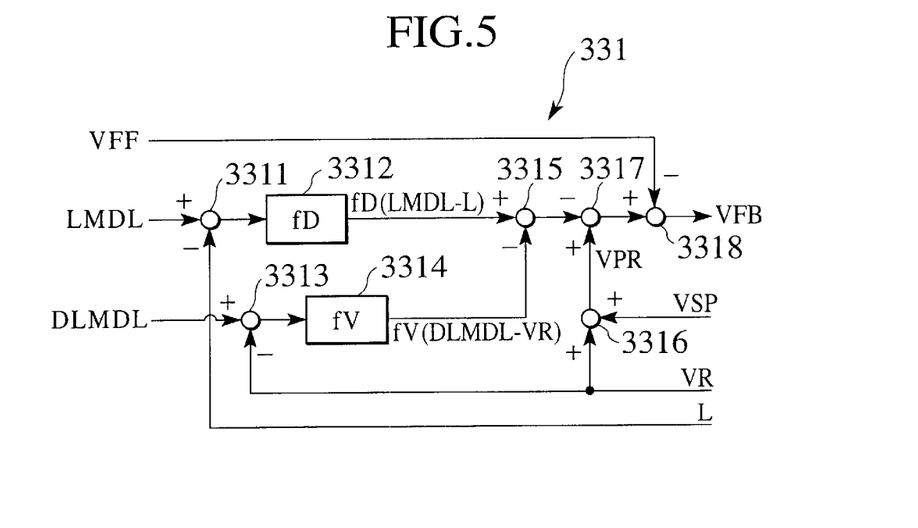
FIG. 5 is a block diagram of an inter-vehicle distance/relative speed control unit of FIG. 2.

The inter-vehicle distance/relative speed control unit 331 calculates the reference host vehicle running speed command value VFB by use of the inter-vehicle distance L between the host vehicle and the preceding vehicle, the relative speed VR of the preceding vehicle to the host vehicle, the host vehicle running speed VSP, the target orbit coincident-host vehicle running speed command value VFF, the target orbit LMDL of the inter-vehicle distance and the target relative speed DLMDL. FIG. 5 shows a constitution of the inter-vehicle distance/relative speed control unit 331. The inter-vehicle distance/relative speed control unit 331 includes an adder/subtractor 3311 for subtracting the actual inter-vehicle distance L from the target orbit LMDL of the inter-vehicle distance, a multiplier 3312 for multiplying an output value from the adder/subtractor 3311 by an inter-vehicle distance gain fD, an adder/subtractor 3313 for subtracting the actual relative speed VR from the target relative speed DLMDL, a multiplier 3314 for multiplying an output value of the adder/subtractor 3313 by a relative speed gain fV, an adder/subtractor 3315 for subtracting an output value of the multiplier 3314 from an output value of the multiplier 3312, an adder 3316 for calculating the preceding vehicle running speed VPR based on the sum of the relative speed VR and the host vehicle running speed VSP, an adder/subtractor 3317 for subtracting an output value of the adder/subtractor 3315 from the preceding vehicle running speed VPR, and an adder/subtractor 3318 for calculating the reference host vehicle running speed command value VFB by subtracting the target orbit coincident-host vehicle running speed command value VFF from an output value of the adder/subtractor 3317. This reference host vehicle running speed command value VFB obtained by the inter-vehicle distance/relative speed control unit 331 is represented by the following equations (12) and (13).

$$VFB = -fD(LMDL-L) + fV(DVMDL-VR) - VFF + VPR \quad (12)$$

$$VPR = VR + VSP \quad (13)$$

In the preceding vehicle acceleration correction unit 332, the preceding vehicle acceleration DVPR is first calculated by use of the host vehicle running speed VSP and the inter-vehicle distance L or the relative speed VR. In this embodiment, a low-pass filter H(s) represented by the following equations (14) to (16) is set, and by use of this low-pass filter H(s), the preceding vehicle acceleration DVPR is calculated as represented by the following equation (17).

$$H(s) = BH(s)/AH(s) \quad (14)$$

$$BH(s) = \omega H^2 \quad (15)$$

$$AH(s) = s^2 + 2 \cdot \zeta H \cdot \omega H \cdot s + \omega H^2 \quad (16)$$

$$DVPR(s) = s \cdot H(s) \cdot VSP + s^2 \cdot H(s) \cdot L = s \cdot H(s) \cdot VSP + s \cdot H(s) \cdot VR \quad (17)$$

Note that, when the relative speed VR can be directly detected, the low-pass filter H(s) may be set as a first-order one.

As apparent from the above equation (17), responsiveness of the low-pass filter H(s) in detecting the acceleration of the preceding vehicle can be changed by changing a polarity thereof. Concretely, when the cutoff frequency $\omega H$ is increased, the responsiveness in detecting the acceleration of the preceding vehicle is improved, whereas the preceding vehicle acceleration correction unit 332 is apt to undergo an influence of a signal noise.

The preceding vehicle acceleration DVPR obtained as described above is multiplied by a gain TV of a value equal to a response time constant TV of the host vehicle running speed VSP with respect to the host vehicle running speed command value VCMD of the host vehicle running speed control system 34. Then, a value obtained by the above multiplication is added to the reference host vehicle running speed command value VFB, and thus the host vehicle running speed command value VCMD is obtained, which is given by the following equation (18). The response of the inter-vehicle distance L to the constant inter-vehicle distance command value LCMD when the host vehicle running speed command value VCMD is inputted to the host vehicle running speed control system 34 having a time constant of TV is represented by the following equations (19) to (22).

$$VCMD = VFB + TV \cdot DVPR \quad (18)$$

$$L(s) = s \cdot GD(s) \cdot VPR(s) + GM(s) \cdot LCMD(s) \quad (19)$$

where $$GD(s) = BD(s)/AD(s) \quad (20)$$

$$BD(s) = 1 - H(s) \quad (21)$$

$$AD(s) = s^2 + (1/TV) \cdot (1 - fV) \cdot s + (1/TV) \cdot fD \quad (22)$$

Here, a relationship between the preceding vehicle running speed VPR and the preceding vehicle acceleration DVPR, which is represented by the following equation (23), is substituted for the above equation (19), thus obtaining the following equation (24).

$$VPR(s) = s^{-1} \cdot DVPR(s) \quad (23)$$

$$L(s) = GD(s) \cdot DVPR(s) + GM(s) \cdot LCMD(s) \quad (24)$$

In the above equation (24), since H(s) is a low-pass filter having a constant gain of 1, a constant gain of the transfer function GD(s) represented by the above equation (20) becomes zero finally, so that an influence of the acceleration of the preceding vehicle is removed. Moreover, it is understood that the influence of the preceding vehicle acceleration is reduced as the polarity of the low-pass filter H(s) is increased. Hence, the following equation (25) is obtained by enhancing the cutoff frequency $\omega H$ of the low-pass filter H(s) sufficiently.

$$L(s) \approx GM(s) \cdot LCMD(s) \quad (25)$$

Figure 6:
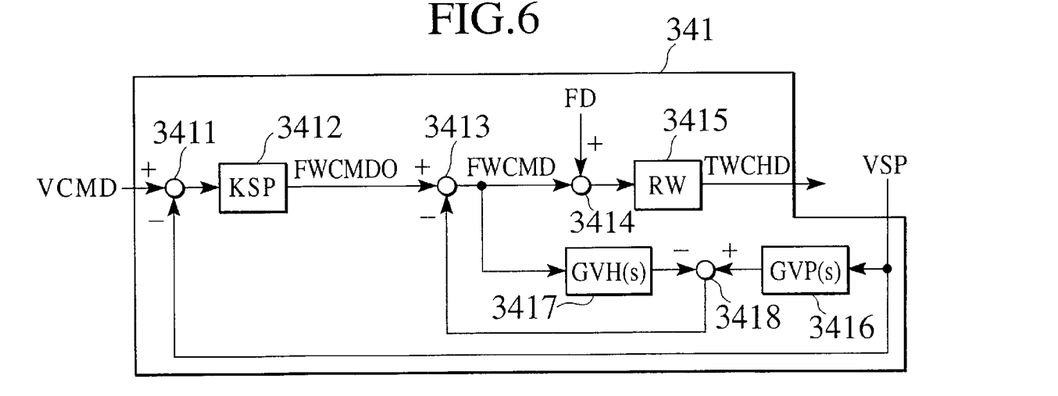
FIG. 6 is a block diagram of a drive shaft torque command value calculation unit of FIG. 2.

Next, description will be made in detail for the drive shaft torque command value calculation unit 341. As shown in FIG. 6, this drive shaft torque command value calculation unit 341 includes an adder/subtractor 3411 for subtracting the host vehicle running speed VSP from the host vehicle running speed command value VCMD calculated and set in the host vehicle running speed command value calculation section 33, a multiplier 3412 for multiplying an output value of the adder/subtractor 3411 by a specified gain KSP to output a reference driving force command value FWCMDO, an adder/subtractor 3413 for subtracting gradient resistance FGH outputted from an adder/subtractor 3418 to be described later from the reference driving force command value FWCMDO to output a driving force command value FWCMD, an adder 3414 for adding the sum FD of air resistance and rolling resistance to the driving force command value FWCMD, a multiplier 3415 for multiplying an output value of the adder 3414 by a tire rolling radius RW to output a drive shaft torque command value TWCMD, a multiplier 3416 for multiplying the host vehicle running speed VSP by a specified gain GVP(s), a multiplier 3417 for multiplying the driving force command value FWCMD by a specified gain GVH(s), and the adder/subtractor 3418 for subtracting an output value of the multiplier 3417 from an output value of the multiplier 3416 to calculate the gradient resistance FGH to be outputted toward the adder/subtractor 3413.

In the drive shaft torque command value calculation unit 341, the driving force command value FWCMD is calculated such that the response of the actual host vehicle running speed VSP to the host vehicle running speed command value VCMD becomes a first-order lag system where the time constant TV, that is, the cutoff frequency $\omega V$ is equalized to 1/TV. Here, assuming that a transmission lag between the drive shaft torque control unit 342 and the vehicle braking/driving system 343 can be ignored, then, objects to be controlled, which are seen from the host vehicle running speed control system, are the driving force command value FWCMD as the input, the host vehicle running speed VSP as the output, and the sum FD of air resistance and rolling resistance and the gradient resistance FGH as the disturbances, which can be represented by the following equations (26) to (28).

$$VSP(s)=GP(s)\cdot\{FWCMD(s)+FG(s)-FD(s)\} \quad (26)$$

$$GP(s)=s^{-1}\cdot KP \quad (27)$$

$$KP=1/M \quad (28)$$

In this embodiment, the sum FD of the air resistance and the rolling resistance is previously calculated in the following equation (29) and added to the objects to be controlled, whereby the influence thereof is removed. Specifically, the sum FD is removed from the above equation (26) and handled individually.

$$FD=\mu A\cdot SV\cdot VSP^2+\mu R\cdot M\cdot g \quad (29)$$

where $\mu A$ is an air resistance coefficient, SV is a frontal projected area, $\mu R$ is a rolling resistance coefficient, and g is a gravitational acceleration.

Meanwhile, the gradient resistance FGH is estimated based on the driving force command value FWCMD and the host vehicle running speed VSP by use of the following equations (30) to (34).

$$FGH(s)=GVP(s)\cdot VSP(s)-GVH(s)\cdot FWCMD(s) \quad (30)$$

where $$GVH(s)=BVH(s)/AVH(s) \quad (31)$$

$$BH(s)=\omega VH \quad (32)$$

$$AVH(s)=s+\omega VH \quad (33)$$

$$GVP(s)=GVH(s)/GP(s) \quad (34)$$

Then, with the reference driving force command value FWCMDO as the input, the driving force command value FWCMD is calculated as in the following equation (35), whereby the influence of the gradient resistance or the like on the input, that is, the output from the reference driving force command value FWCMDO, that is, the propagation characteristic to the host vehicle running speed VSP, is eliminated.

$$FWCMD=FWCMDO-FGH \quad (35)$$

The drive shaft torque command value TWCMD is given by the following equation (36) based on the tire rolling radius RW by use of the driving force command value FWCMD and the sum FD of the air resistance and the rolling resistance.

$$TWCMD=RW\cdot(FWCMD+FD) \quad (36)$$

Assuming that the disturbance to the transmission characteristic, in which the reference driving force command value FWCMDO is the input and the host vehicle running speed VSP is the output, has been removed due to compensation for the running resistance as described above, the transmission characteristic from the reference driving force command value FWCMDO to the host vehicle running speed VSP is given by the following equation (37). In this system, if the reference driving force command value FWCMDO is generated as represented in the following equation (38), then the transfer function GV(s) from the host vehicle running speed command value VCMD to the host vehicle running speed VSP is given by the following equations (39) to (41). Then, the specified gain KSP is set as represented in the following equation (42), whereby this host vehicle running speed control system becomes the first-order lag system where the time constant TV, that is, the cutoff frequency $\omega V$ is equalized to $1/TV$.

$$VSP(s)=GP(s)\cdot FWCMDO(s) \quad (37)$$

$$FWCMDO=KSP\cdot(VCMD-VSP) \quad (38)$$

$$GV(s)=BV(s)/AV(s) \quad (39)$$

$$BV(s)=KSP/M \quad (40)$$

$$AV(s)=s+(KSP/M) \quad (41)$$

$$KSP/M=1/TV \quad (42)$$

Next, description will be made in detail for the drive shaft torque control unit 342. This drive shaft torque control unit 342 calculates the engine torque command value TER and the brake torque command value TBR for realizing the drive shaft torque command value TWCMD calculated and set in the drive shaft torque command value calculation unit 341.

First, when a torque amplification factor by means of a torque converter of the automatic transmission 3 is RT, a transmission gear ratio is RAT, a differential gear ratio is RDEF, an engine inertia is JE, and the number of engine revolutions is NE, a relationship of a drive shaft torque TW to an engine torque TE and the brake torque command value TBR is represented by the following equations (43) and (44).

$$TW=KGEAR\cdot\{TE-JE\cdot(dNE/dt)\}-TBR \quad (43)$$

where $$KGEAR=RT\cdot RAT\cdot RDEF \quad (44)$$

If the host vehicle has already run behind the preceding vehicle, the acceleration is limited within a specified value range, and a rate of change of the number of engine revolutions is low, then an influence of the engine inertia is regarded as small. Therefore, when the engine inertia is set at zero, the above equation (43) becomes the following equation (45).

$$TW=KGEAR\cdot TE-TBR \quad (45)$$

Figure 7:
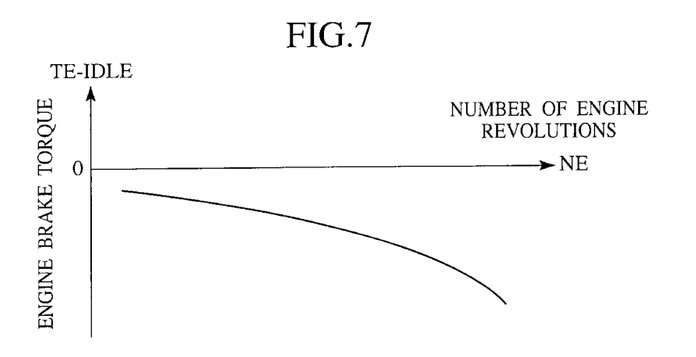
FIG. 7 is a map of engine brake torque.

Subsequently, the engine torque command value TER for the drive shaft torque command value TWCMD is calculated by the following equation (46), and determination is made as to whether or not the engine torque command value TER is equal to an engine brake torque TE_IDLE or more. The engine brake torque TE_IDLE can be obtained by referring to a map of the number of engine revolutions and the engine brake torque, which is as shown in FIG. 7.

$$TER=TWCMD/KGEAR \quad (46)$$

Here, if the engine torque command value TER is not less than the engine brake torque TE_IDLE, then exact torque in accordance with the drive shaft torque command value can be realized only by means of the engine torque without using a brake. On the other hand, if the engine torque command value TER is less than the engine brake torque TE_IDLE, then the brake torque command value TBR for according the drive shaft torque TW with the command value TWCMD thereof is calculated considering the brake torque derived from the engine brake torque. Hence, a distribution control law for the engine torque command value TER and the brake torque command value TBR when the engine torque command value TER is not less than the engine brake torque TE_IDLE is given by the following equations (47) and (48).

$$TBR=0 \qquad (47)$$

$$TER=TWCMD/KGEAR \qquad (48)$$

On the other hand, when the engine torque command value TER is less than the engine brake torque TE_IDLE, the engine torque TE in the above equation (45) is first substituted for the engine brake torque TE_IDLE, thus obtaining the following equation (49). Furthermore, the brake torque command value TBR in the equation (49) is substituted for the drive shaft torque command value TWCMD, and thus the brake torque command value TBR represented by the following equation (50) is given. Then, when a cross-section area of the wheel cylinder is Ab, an effective diameter of a disc rotor is Rb, and a pad friction coefficient is $\mu b$, a brake fluid pressure command value PBR in accordance with the brake torque command value TBR is represented by the following equations (51) and (52).

$$TW=KGEAR \cdot TE\_IDLE-TBR \qquad (49)$$

$$TBR=KGEAR \cdot TE\_IDLE-TWCMD \qquad (50)$$

$$KBRK=8 \cdot Ab \cdot Rb \cdot \mu b \qquad (52)$$

Figure 8:
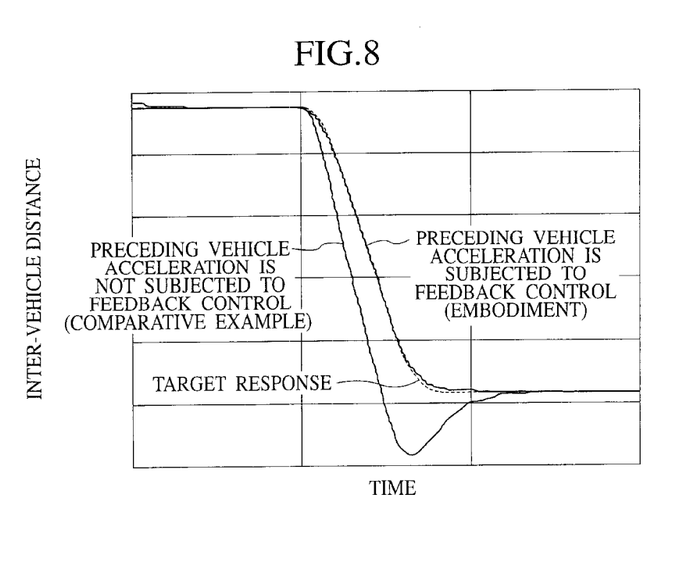
FIG. 8 is an explanatory view of an operation of the vehicular running control apparatus of FIG. 2.

FIG. 8 shows a response characteristic in a simulation of changing a target inter-vehicle distance by means of the vehicular running control apparatus of this embodiment. As apparent from this drawing, in this embodiment where the acceleration of the preceding vehicle is subjected to feedback control, the response characteristic thereof coincides well with a target response characteristic. This is because the gain by which the preceding vehicle acceleration is multiplied is set at the response time constant of the host vehicle running speed control system as described above, whereby a response lag of the host vehicle running speed control system can be compensated. On the other hand, in a comparative example where the acceleration of the preceding vehicle is not subjected to the feedback control, overshoot occurs due to underdamping.

Figure 9:
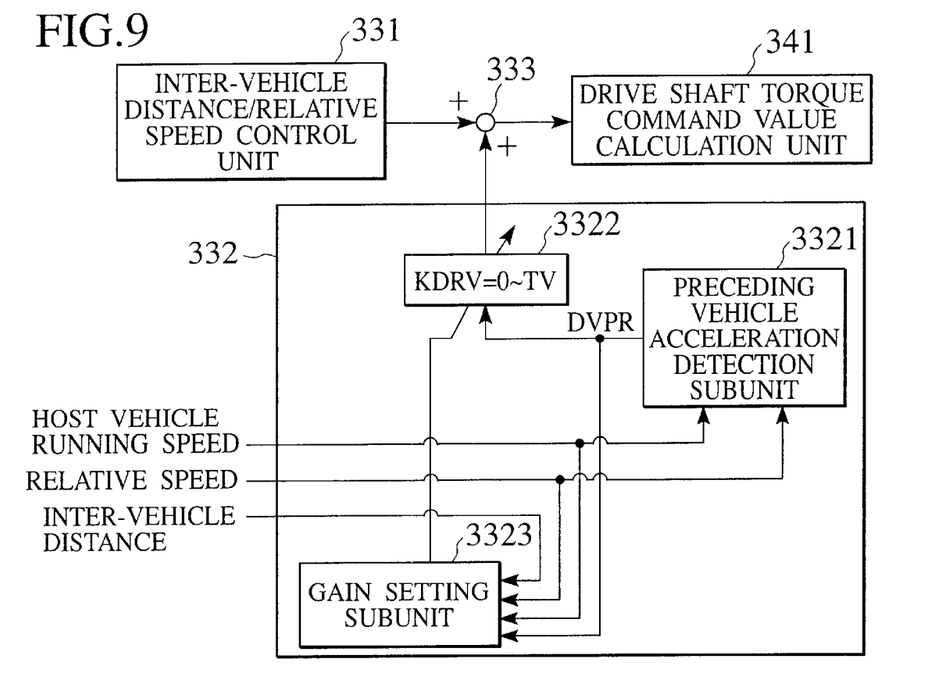
FIG. 9 is a block diagram showing a second embodiment of the vehicular running control apparatus of the present invention.

Next, description will be made for a second embodiment of the vehicular running control apparatus of the present invention with reference to FIG. 9. The entire constitution of the vehicular running control apparatus of this embodiment is similar to the one of the first embodiment, which is shown in FIG. 2. However, among the sections and the units, the preceding vehicle acceleration correction unit 332 is changed in this embodiment. Similarly to the first embodiment, this preceding vehicle acceleration correction unit 332 includes a preceding vehicle acceleration detection subunit 3321 for detecting the preceding vehicle acceleration DVPR, a multiplier 3322 for multiplying the preceding vehicle acceleration DVPR detected in the preceding vehicle acceleration detection subunit 3321 by a specified gain KDRV, and a gain setting subunit 3323 for changing and setting the gain KDRV of the multiplier 3322. Note that a setting range of the gain KDRV of the multiplier 3322 is from the response time constant TV of the host vehicle running speed VSP with respect to the host vehicle running speed command value VCMD of the host vehicle running speed control system 34 to zero.

In order to calculate the preceding vehicle acceleration DVPR, it is necessary to calculate the host vehicle running speed, the relative speed or the rate of change of the inter-vehicle distance as described above, and for example, ride comfort may be possibly damaged due to the influence of a noise caught on an inter-vehicle distance detection signal. Accordingly, as described above, the gain KDRV of the multiplier 3322, by which the preceding vehicle acceleration DVPR is multiplied, is made variable from the response time constant TV of the host vehicle running speed control system 34 to zero. In a running state where the inter-vehicle distance with the preceding vehicle is not required to follow the target response strictly, or in a running state where the ride comfort is regarded as important, the gain KDRV of the multiplier 3322 is approximated to zero. On the contrary, when a difference of the inter-vehicle distance from the target response is desired to be decreased, the gain KDRV is approximated to the response time constant TV.

Now, when the response time constant TV of the above equation (18) is substituted for the gain KDRV of the multiplier 3322, the above equation (21) is represented as the following equation (53).

$$BD(s)=1-KDRV/TV \cdot H(s) \qquad (53)$$

In the equation (53), since H(s) is the low-pass filter having a constant gain of 1 as described above, the constant gain of the transfer function GD(s) in the above equation (24) becomes zero when the gain KDRV of the multiplier 3322 is the response time constant TV of the host vehicle running speed control system 34, so that the influence of the acceleration of the preceding vehicle is removed. On the contrary, if the gain KDRV of the multiplier 2322 is set at zero, then the effect of the preceding vehicle acceleration feedback becomes zero, and the inter-vehicle distance response of this embodiment becomes equivalent to that of the related art. Hence, the effect of the preceding vehicle acceleration feedback can be made variable by changing the gain KDRV of the multiplier 3322 from zero to the response time constant TV of the host vehicle running speed control system 34.

In general, as running states where the inter-vehicle distance is not required to follow the target response strictly and priority is given to the ride comfort, the following are enumerated.

1) State where the inter-vehicle distance L is long
2) State where the relative speed VR of the preceding vehicle with respect to the host vehicle is small
3) State where the relative acceleration DVR of the preceding vehicle with respect to the host vehicle or the preceding vehicle acceleration DVPR is small
4) State where a difference ERRL between the target inter-vehicle distance and the actual inter-vehicle distance is small
5) State where a difference ERRVR between the target relative speed and the actual relative speed is small In these running states, the gain KDRV of the multiplier 3322 is set small. Moreover, all of the above-described running states do not always have to be considered for setting the gain KDRV of the multiplier 3322, and for example, some of the running states may be used therefor in combination. For example, the above-described states 1) to 3) may be selected to prepare a three-dimensional map, and the gain KDRV of the multiplier 3322 may be set smaller as the inter-vehicle distance is longer, the relative speed is smaller, and the relative acceleration is smaller. Furthermore, since degrees of the running states as described above are different depending on the running speed, the running speed of the preceding vehicle and the running speed of the host vehicle may be combined. In general, since the inter-vehicle distance command value becomes relatively larger during high-speed running, the inter-vehicle distance command value is varied in proportion to the running speed so as to correct a size of the gain KDRV of the multiplier 3322, which has been obtained in the above three-dimensional map, to be rather small at the high speed and to be rather large at the low speed, whereby the ride comfort and the follow-up to the inter-vehicle distance target value can be made compatible with each other.

Figure 10:
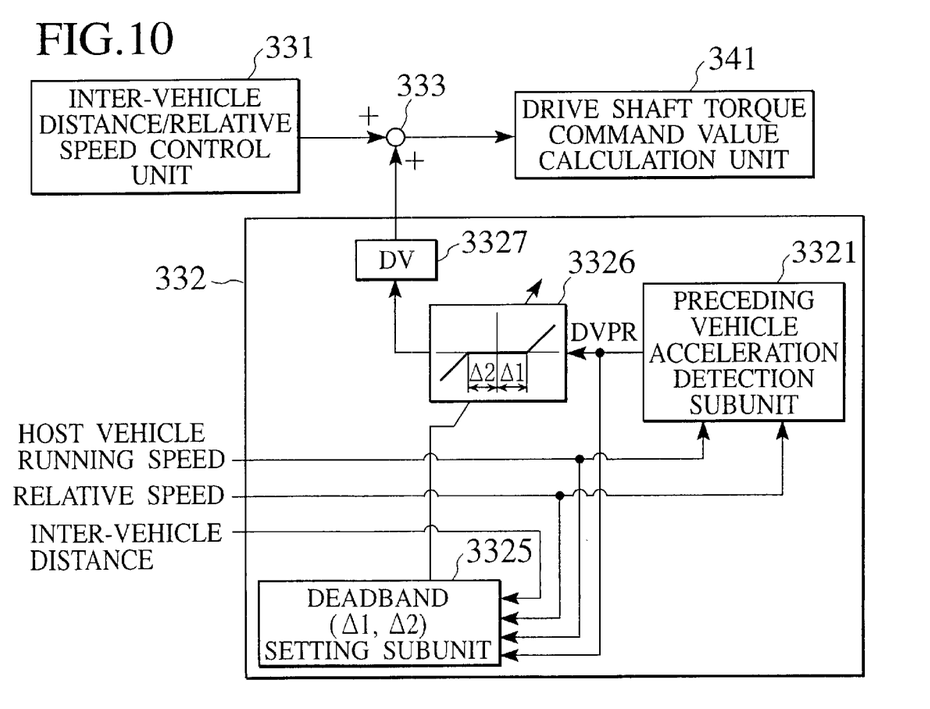
FIG. 10 is a block diagram showing a third embodiment of the vehicular running control apparatus of the present invention.

Next, description will be made for a third embodiment of the vehicular running control apparatus of the present invention with reference to FIG. 10. The entire constitution of the vehicular running control apparatus of this embodiment is similar to the one of the first embodiment, which is shown in FIG. 2. However, among the sections and the units, the preceding vehicle acceleration correction unit 332 is changed in this embodiment. Similarly to the first embodiment, this preceding vehicle acceleration correction unit 332 includes a preceding vehicle acceleration detection subunit 3321 for detecting the preceding vehicle acceleration DVPR, a deadband processing subunit 3326 for performing deadband processing for the preceding vehicle acceleration DVPR detected in the preceding vehicle acceleration detection subunit 3321, a multiplier 3327 for multiplying an output value of the deadband processing subunit 3326 by the response time constant TV of the host vehicle running speed control system 34, and a deadband setting subunit 3325 for setting deadband widths Δ1 and Δ2 of the deadband processing subunit 3326.

In this embodiment, the deadbands Δ1 and Δ2 (Δ1>0, Δ2<0) are provided in a range where the preceding vehicle acceleration DVPR is small in order to remove a noise caught on the preceding vehicle acceleration DVPR. Moreover, in the deadband processing subunit 3326, an output of the preceding vehicle acceleration DVPR in this deadband width is set at zero, that is, correction of the host vehicle running speed command value by means of the preceding vehicle acceleration DVPR is forbidden. Furthermore, the deadbands Δ1 and Δ2 are changed in response to the running state. When the output value of the deadband processing subunit 3326 is defined as DVPROUT, the output value DVPROUT is represented by the following equations (54) to (58).

When DVPR>0, if DVPR≧Δ1, $DVPROUT=DVPR-\Delta 1$ (54)

if DVPR<Δ1, $DVPROUT=0$ (55)

When DVPR<0, if DVPR≦-Δ2, $DVPROUT=DVPR+\Delta 2$ (56)

if DVPR>-Δ2, $DVPROUT=0$ (57)

When DVPR=0, $DVPROUT=0$ (58)

The fact that the output value DVPROUT of the deadband processing subunit 3326 is zero means that a feedback effect of the preceding vehicle acceleration DVPR does not exist. Therefore, the feedback effect of the preceding vehicle acceleration can be made variable by changing sizes of the deadbands Δ1 and Δ2. Accordingly, in the running state where the inter-vehicle distance with the preceding vehicle is not required to follow the target response strictly, or in the running state where the ride comfort is regarded as important, the sizes of the deadbands Δ1 and Δ2 of the deadband processing subunit 3326 are increased. On the contrary, when the difference of the inter-vehicle distance from the target response is desired to be reduced, the sizes of the deadbands Δ1 and Δ2 are reduced.

As the running state where the sizes of the deadbands Δ1 and Δ2 of the deadband processing subunit 3326 are set large, the one enumerated in the second embodiment can be applied. Moreover, all of the above-described running states do not always have to be considered for setting the deadbands Δ1 and Δ2 of the deadband processing subunit 3326, and for example, some of the running states may be used therefor in combination. For example, the above-described states 1) to 3) may be selected to prepare the three-dimensional map, and the sizes of the deadbands Δ1 and Δ2 of the deadband processing subunit 3326 may be set larger as the inter-vehicle distance is longer, the relative speed is smaller, and the relative acceleration is smaller. Furthermore, since the degrees of the running states as described above are different depending on the running speed, the running speed of the preceding vehicle and the running speed of the host vehicle may be combined. In general, since the inter-vehicle distance command value becomes relatively larger during high-speed running, the inter-vehicle distance command value is varied in proportion to the running speed so as to correct the sizes of the deadbands Δ1 and Δ2 of the deadband processing subunit 3326, which has been obtained in the above three-dimensional map, to be rather large at the high speed and to be rather small at the low speed, whereby the ride comfort and the follow-up to the inter-vehicle distance target value can be made compatible with each other.

Figure 11:
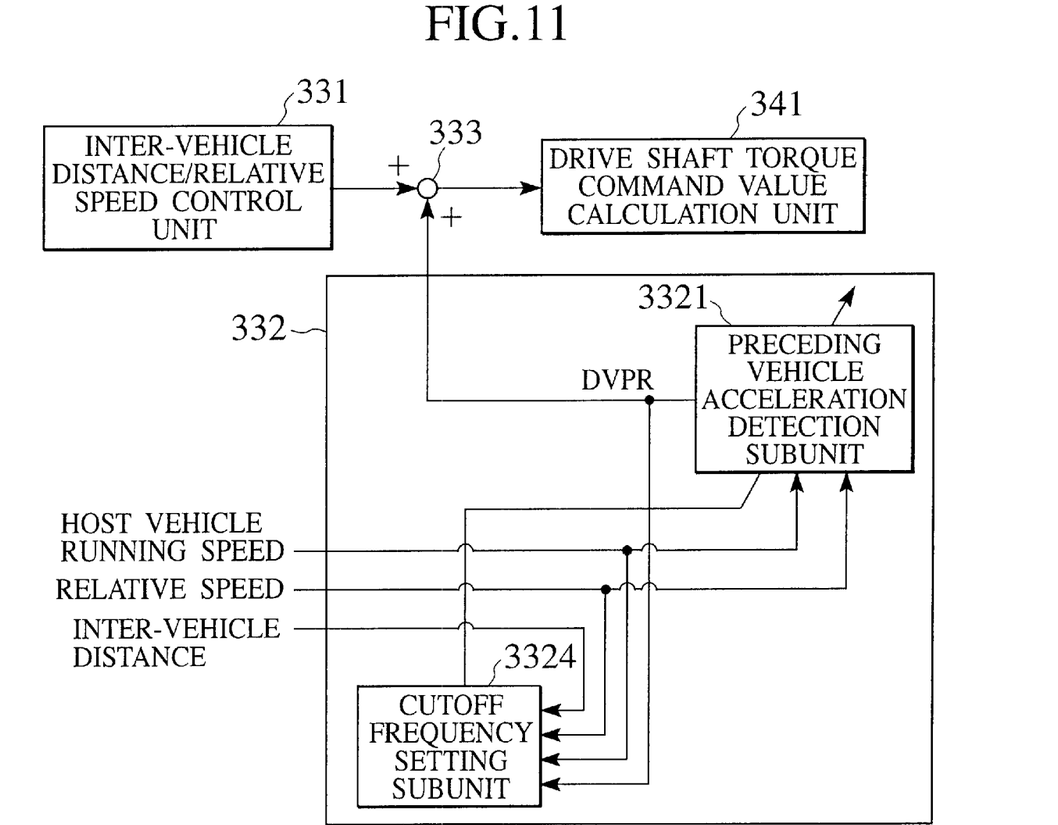
FIG. 11 is a block diagram showing a fourth embodiment of the vehicular running control apparatus of the present invention.

Next, description will be made for a fourth embodiment of the vehicular running control apparatus of the present invention with reference to FIG. 11. The entire constitution of the vehicular running control apparatus of this embodiment is similar to the one of the first embodiment, which is shown in FIG. 2. However, among the sections and the units, the preceding vehicle acceleration correction unit 332 is changed in this embodiment. Similarly to the first embodiment, this preceding vehicle acceleration correction unit 332 includes a preceding vehicle acceleration detection subunit 3321 for detecting the preceding vehicle acceleration DVPR, and a cutoff frequency setting subunit 3324 for setting the cutoff frequency ωH of the preceding vehicle acceleration detection subunit 3321.

When the responsiveness of the low-pass filter H(s) having the constant gain of 1 is improved, which has been used for calculating the preceding vehicle acceleration DVPR in the first embodiment, detection of the preceding vehicle acceleration DVPR becomes rapid. Therefore, a follow-up characteristic to the inter-vehicle distance target value is improved. However, the preceding vehicle acceleration correction unit 332 is apt to undergo the influence of a noise, possibly causing damage to the ride comfort. On the contrary, when the responsiveness of the low-pass filter H(s) is lowered, detection of the preceding vehicle acceleration DVPR becomes slow, and the follow-up characteristic to the inter-vehicle distance target value is lowered. However, the preceding vehicle acceleration correction unit 332 is unlikely to undergo the influence of a noise, thus improving the ride comfort. In this embodiment, the responsiveness of the low-pass filter H(s) used for calculating the preceding vehicle acceleration DVPR is made variable. In the running state where the inter-vehicle distance with the preceding vehicle is not required to follow the target response strictly, or in the running state where the ride comfort is regarded as important, the responsiveness of the low-pass filter H(s) is lowered. On the contrary, when the difference of the inter-vehicle distance from the target response is desired to be decreased, the responsiveness of the low-pass filter H(s) is improved. In order to change the responsiveness of the low-pass filter H(s), it is sufficient if the cutoff frequency ωH in the above equations (14) and (15) is changed. Since a variable range of the responsiveness of the low-pass filter H(s) is different depending on an inter-vehicle distance detection apparatus to be used, the range is set by experiment or simulation, where stability and control performance of the control system can be maintained.

As the running state where the responsiveness of the low-pass filter H(s) used for calculating the preceding vehicle acceleration DVPR is lowered (cutoff frequency ωH is decreased), the one enumerated in the second embodiment can be applied. Moreover, all of the above-described running states do not always have to be considered for setting the responsiveness (cutoff frequency ωH) of the low-pass filter H(s) used for calculating the preceding vehicle acceleration DVPR, and for example, some of the running states may be used therefor in combination. For example, the above-described states 1) to 3) may be selected to prepare the three-dimensional map, and the responsiveness of the low-pass filter H(s) used for calculating the preceding vehicle acceleration DVPR may be lowered more (cutoff frequency ωH is decreased) as the inter-vehicle distance is longer, the relative speed is smaller, and the relative acceleration is smaller. Furthermore, since the degrees of the running states as described above are different depending on the running speed, the running speed of the preceding vehicle and the running speed of the host vehicle may be combined. In general, since the inter-vehicle distance command value becomes relatively larger during the high-speed running, the inter-vehicle distance command value is varied in proportion to the running speed so as to correct the responsiveness (cutoff frequency ωH) of the low-pass filter H(s) used for calculating the preceding vehicle acceleration DVPR, which has been obtained in the above three-dimensional map, to be rather low at the high speed and to be rather high at the low speed, whereby the ride comfort and the follow-up to the inter-vehicle distance target value can be made compatible with each other.

Note that, in the above-described embodiments, the acceleration of the preceding vehicle has been calculated by use of the running speed of the host vehicle, the relative speed of the preceding vehicle with respect to the host vehicle, or the inter-vehicle distance between the host vehicle and the preceding vehicle. However, by use of, for example, communication between vehicles, which is so-called inter-vehicle communication, acceleration detected by the preceding vehicle itself by means of an acceleration sensor may be received by the host vehicle by means of the inter-vehicle communication.

Japanese Patent Application Serial No. 2001-140838 is expressly incorporated herein by reference in its entirety.

What is claimed is:

1. A vehicular running control apparatus, comprising:
    an inter-vehicle distance detection device configured to detect an inter-vehicle distance between a host vehicle and a preceding vehicle;
    a host vehicle running speed detection device configured to detect a host vehicle running speed;
    a target inter-vehicle distance setting device configured to set a target inter-vehicle distance between the host vehicle and the preceding vehicle based on the inter-vehicle distance detected by the inter-vehicle distance detection device and the host vehicle running speed detected by the host vehicle running speed detection device;
    a host vehicle running speed command value calculation device configured to calculate a running speed command value of the host vehicle based on the inter-vehicle distance detected by the inter-vehicle distance detection device, the host vehicle running speed detected by the host vehicle running speed detection device and the target inter-vehicle distance set by the target inter-vehicle distance setting device;
    a preceding vehicle acceleration detection device configured to detect an acceleration of the preceding vehicle;
    a host vehicle running speed command value correction device configured to multiply the acceleration of the preceding vehicle, the acceleration being detected by the preceding vehicle acceleration detection device, by a specified gain to calculate a host vehicle running speed command value correction amount, and to add the host vehicle running speed command value correction amount to the host vehicle running speed command value to calculate a corrected host vehicle running speed command value; and
    a host vehicle running speed control device configured to control the host vehicle running speed based on the corrected host vehicle running speed command value corrected by the host vehicle running speed command value correction device,
    wherein a response time constant when the host vehicle running speed control device controls the host vehicle running speed based on the corrected host vehicle running speed command value is set at the specified gain multiplied with the acceleration of the preceding vehicle.

2. A vehicular running control apparatus according to claim 1, wherein the host vehicle running speed command value correction device sets the specified gain multiplied with the acceleration of the preceding vehicle in a range from the response time constant when the host vehicle running speed control device controls the host vehicle running speed based on the corrected host vehicle running speed command value to zero.

3. A vehicular running control apparatus according to claim 2, wherein the host vehicle running speed command value correction device sets the specified gain multiplied with the acceleration of the preceding vehicle large when responsiveness of the inter-vehicle distance with respect to the target inter-vehicle distance set by the target inter-vehicle distance setting device is improved, and sets the specified gain multiplied with the acceleration of the preceding vehicle small when ride comfort of the host vehicle is improved.

4. A vehicular running control apparatus according to claim 2, further comprising: a running control state detection device configured to detect at least one of the inter-vehicle distance between the host vehicle and the preceding vehicle, the running speed of the host vehicle, a running speed of the preceding vehicle, a relative speed of the preceding vehicle with respect to the host vehicle, a relative acceleration of the preceding vehicle with respect to the host vehicle, the acceleration of the preceding vehicle, a difference between the target inter-vehicle distance and the inter-vehicle distance, and a difference between a target relative speed and the relative speed,
    wherein the host vehicle running speed correction device sets the specified gain multiplied with the acceleration of the preceding vehicle small at any of the times when the inter-vehicle distance is large, when the running speed of the host vehicle is large, when the running speed of the preceding vehicle is large, when the relative speed of the preceding vehicle with respect to the host vehicle is small, when the relative acceleration of the preceding vehicle with respect to the host vehicle is small, when the acceleration of the preceding vehicle is small, when the difference between the target inter-vehicle distance and the inter-vehicle distance is small, and when the difference between the target relative speed and the relative speed is small.

5. A vehicular running control apparatus according to claim 1, wherein the host vehicle running speed command value correction device provides a deadband for the host vehicle running speed command value correction amount obtained by multiplying the acceleration of the preceding vehicle by the specified gain, and forbids the correction of the host vehicle running speed command value when the host vehicle running speed command value correction amount is within a range of the deadband.

6. A vehicular running control apparatus according to claim 5, wherein the host vehicle running speed command value correction device makes the deadband variable, sets the deadband small when responsiveness of the inter-vehicle distance with respect to the target inter-vehicle distance set by the target inter-vehicle distance setting device is improved, and sets the deadband large when ride comfort of the host vehicle is improved.

7. A vehicular running control apparatus according to claim 5, further comprising: a running control state detection device configured to detect at least one of the inter-vehicle distance between the host vehicle and the preceding vehicle, the running speed of the host vehicle, a running speed of the preceding vehicle, a relative speed of the preceding vehicle with respect to the host vehicle, a relative acceleration of the preceding vehicle with respect to the host vehicle, the acceleration of the preceding vehicle, a difference between the target inter-vehicle distance and the inter-vehicle distance, and a difference between a target relative speed and a relative speed, wherein the host vehicle running speed command value correction device sets the deadband large at any of the times when the inter-vehicle distance is large, when the running speed of the host vehicle is large, when the running speed of the preceding vehicle is large, when the relative speed of the preceding vehicle with respect to the host vehicle is small, when the relative acceleration of the preceding vehicle with respect to the host vehicle is small, when the acceleration of the preceding vehicle is small, when the difference between the target inter-vehicle distance and the inter-vehicle distance is small, and when the difference between the target relative speed and the relative speed is small.

8. A vehicular running control apparatus according to claim 1, wherein the host vehicle running speed command value correction device includes a low-pass filter having a constant gain of 1 and makes responsiveness of the low-pass filter variable.

9. A vehicular running control apparatus according to claim 8, wherein the host vehicle running speed command value correction device improves the responsiveness of the low-pass filter when responsiveness of the inter-vehicle distance with respect to the target inter-vehicle distance set by the target inter-vehicle distance setting device is improved, and lowers the responsiveness of the low-pass filter when ride comfort of the host vehicle is improved.

10. A vehicular running control apparatus according to claim 8, further comprising: a running control state detection device configured to detect at least one of the inter-vehicle distance between the host vehicle and the preceding vehicle, the running speed of the host vehicle, the running speed of the preceding vehicle, a relative speed of the preceding vehicle with respect to the host vehicle, a relative acceleration of the preceding vehicle with respect to the host vehicle, the acceleration of the preceding vehicle, a difference between the target inter-vehicle distance and the inter-vehicle distance, and a difference between a target relative speed and a relative speed, wherein the host vehicle running speed command value correction device lowers the responsiveness of the low-pass filter at any of the times when the inter-vehicle distance is large, when the running speed of the host vehicle is large, when the running speed of the preceding vehicle is large, when the relative speed of the preceding vehicle with respect to the host vehicle is small, when the relative acceleration of the preceding vehicle with respect to the host vehicle is small, when the acceleration of the preceding vehicle is small, when the difference between the target inter-vehicle distance and the inter-vehicle distance is small, and when the difference between the target relative speed and the relative speed is small.

11. A vehicular running control apparatus, comprising:

inter-vehicle distance detection means for detecting an inter-vehicle distance between a host vehicle and a preceding vehicle;

host vehicle running speed detection means for detecting a host vehicle running speed;

target inter-vehicle distance setting means for setting a target inter-vehicle distance between the host vehicle and the preceding vehicle based on the inter-vehicle distance detected by the inter-vehicle distance detection means and the host vehicle running speed detected by the host vehicle running speed detection means;

host vehicle running speed command value calculation means for calculating a running speed command value of the host vehicle based on the inter-vehicle distance detected by the inter-vehicle distance detection means, the host vehicle running speed detected by the host vehicle running speed detection means and the target inter-vehicle distance set by the target inter-vehicle distance setting means;

preceding vehicle acceleration detection means for detecting an acceleration of the preceding vehicle;

host vehicle running speed command value correction means for multiplying the acceleration of the preceding vehicle, the acceleration being detected by the preceding vehicle acceleration detection means, by a specified gain to calculate a host vehicle running speed command value correction amount, and for adding the host vehicle running speed command value correction amount to the host vehicle running speed command value to calculate a corrected host vehicle running speed command value; and host vehicle running speed control means for controlling the host vehicle running speed based on the corrected host vehicle running speed command value corrected by the host vehicle running speed command value correction means, wherein a response time constant when the host vehicle running speed control means controls the host vehicle running speed based on the corrected host vehicle running speed command value is set at the specified gain multiplied with the acceleration of the preceding vehicle.

* * * * *